United States Patent [19]

Irle et al.

[11] Patent Number: 6,139,918
[45] Date of Patent: Oct. 31, 2000

[54] PROCESS FOR PREPARING PHYSICALLY DRYING COATINGS FROM AQUEOUS DISPERSIONS

[75] Inventors: Christoph Irle, Krefeld; Harald Blum, Leverkusen; Joachim Petzoldt, Monheim; Heino Müller, Leverkusen, all of Germany

[73] Assignee: Bayer Aktiengesellschaft, Leverkusen, Germany

[21] Appl. No.: 09/368,709

[22] Filed: Aug. 5, 1999

[30] Foreign Application Priority Data

Aug. 17, 1998 [DE] Germany .......................... 198 37 063
Aug. 17, 1998 [DE] Germany .......................... 198 37 062

[51] Int. Cl.$^7$ ...................................................... B05D 3/02
[52] U.S. Cl. ...................... 427/385.5; 528/45; 524/507
[58] Field of Search .......................... 427/385.5; 528/45; 524/507

[56] References Cited

U.S. PATENT DOCUMENTS

| | | | |
|---|---|---|---|
| 4,968,536 | 11/1990 | Goldner et al. | 427/388.4 |
| 5,281,655 | 1/1994 | Mitsuji et al. | 524/507 |
| 5,336,711 | 8/1994 | Schneider et al. | 524/507 |

FOREIGN PATENT DOCUMENTS

| | | |
|---|---|---|
| 2203868 | 10/1997 | Canada . |
| 42 37 957 | 5/1993 | Germany . |
| 1084203 | 9/1964 | United Kingdom . |

OTHER PUBLICATIONS

Journal of Coating Technology, 67, No. 844, pp. 57–65 May 1995.

*Primary Examiner*—Erma Cameron
*Attorney, Agent, or Firm*—Joseph C. Gil; Thomas W. Roy

[57] ABSTRACT

The present invention relates to a process for preparing a coated substrate by coating the substrate with an aqueous dispersion, which may be physically cured to form a light stable, elastic coating, containing A) a polyol component containing A1) 20 to 60 wt. %, based on the resin solids content of polyol component A), of a polyester resin containing 10 to 60 wt. %, based on the weight of the polyester resin, of one or more aliphatic, saturated or unsaturated monocarboxylic acids having 8 to 30 carbon atoms, and 0.4 to 5 wt. %, based on the weight of the polyester resin, of one or more radically polymerizable α,β-unsaturated mono- or di-carboxylic acids having 3 to 8 carbon atoms, or their anhydrides, and A2) 40 to 80 wt. %, based on the resin solids content of polyol component A), of a polyacrylate, which is prepared in the presence of component A1), and B) 1 to 70 wt. %, based on the resin solids content of the aqueous dispersion, of one or more blocked polyisocyanates, and physically curing the dispersion to form a coating.

14 Claims, No Drawings

PROCESS FOR PREPARING PHYSICALLY DRYING COATINGS FROM AQUEOUS DISPERSIONS

BACKGROUND OF THE INVENTION

1. Field of the Invention

The present invention relates to a process for preparing coatings from aqueous dispersions which rapidly dry physically and at the same time result in coatings that are resistant to the impact of stones and are stable to weathering, especially for the series lacquering of motor vehicles.

2. Description of the Prior Art

In the series coating of motor vehicles, multilayer coatings are generally used. Aqueous coating compositions are by increasing used to prepare these coatings. In the case of such modern coatings, demands are also made regarding application costs. The aim is to apply the coating using the smallest possible number of individual steps and such that the individual steps are as inexpensive as possible.

In the case of the usual multilayer coatings applied to motor vehicles, a stone impact protective coating and a filler coating, or a combination of the two coatings ("stone impact protective filler"), is applied to a metal surface which has initially been primer coated by cathodic electro-dipcoating (CDC). There are then applied to those coatings either a pigmented base coat and a clear top coat or, alternatively, a pigmented top coat.

The stone impact protective and/or filler coating levels out any uneven areas in the surface and, as a result of a high degree of elasticity and deformability, provides good resistance to the impact of stones. Previously, soft polyester- or polyether-polyurethanes and polyisocyanate or melamine crosslinking agents have been used for this coating. Before the base coat and clear top coat or finishing lacquer are applied, the stone impact protective filler is stoved. This is necessary in order to improve the condition of the finishing lacquer and to polish off the filler coating before the upper lacquer coatings are applied. After the clear lacquer or finishing lacquer is applied, stoving is then carried out again. A disadvantage of this process is that two expensive stoving operations are necessary. Lacquers that rapidly dry physically, i.e., without a stoving operation (such as coatings formulated from polyacrylates) do not have the required resistance to the impact of stones because they crosslink to form brittle films during the stoving operation.

An object of the present invention is to provide binders which are storage stable, have good resistance to the impact of stones and rapidly dry physically. It is an additional object of the present invention to provide binders which are lightfast and stable to weathering, especially in the case of finishing or base lacquers with moderate coverage or in areas in which no pigmented finishing or base lacquer is applied at all. It is a further object of the present invention to provide an aqueous coating composition that combines the fundamental properties of a stone impact protective filler and a finishing lacquer binder and, in addition, that rapidly dries physically.

Surprisingly, it has been found that this object can be achieved by the use of a combination of specific aqueous polyols and blocked polyisocyanates. The polyol dispersions according to the invention are characterized in that they contain graft copolymers based on polyesters-polyacrylates in which the polyester component is based on long-chain aliphatic monocarboxylic acids and α,β-unsaturated carboxylic acids. The suitability of the polyol dispersions according to the invention for automotive fillers is surprising because previously when stoving lacquers containing a high proportion of polyacrylate were used for automotive fillers, they did not satisfy the high property requirements with respect to elasticity and resistance to the impact of stones.

Coatings and/or filler coatings based on aqueous binders that are resistant to the impact of stones are described, for example, in EP-A 330,139. It is claimed that a polyacrylate can be mixed with an OH- and COOH-functional polyester. No examples are directed to this embodiment and graft copolymerization of the polyacrylate onto a polyester as grafting base is not described. The claimed dispersions of acid-functional polyesters are known to have poor storage stability, since they undergo rapid chemical degradation as a result of cleavage of the ester bonds as described, e.g., in Jones, T. E.; McCarthy, J. M., J. Coatings Technol. 76 (844), p. 57 (1995).

SUMMARY OF THE INVENTION

The present invention relates to a process for preparing a coated substrate by coating the substrate with an aqueous dispersion, which may be physically cured to form a light stable, elastic coating, containing A) a polyol component containing
   A1) 20 to 60 wt. %, based on the resin solids content of polyol component A), of a polyester resin containing 10 to 60 wt. %, based on the weight of the polyester resin, of one or more aliphatic, saturated or unsaturated monocarboxylic acids having 8 to 30 carbon atoms, and 0.4 to 5 wt. %, based on the weight of the polyester resin, of one or more radically polymerizable α,β-unsaturated mono- or di-carboxylic acids having 3 to 8 carbon atoms, or their anhydrides, and
   A2) 40 to 80 wt. %, based on the resin solids content of polyol component A), of a polyacrylate, which is prepared in the presence of component A1), and
B) 1 to 70 wt. %, based on the resin solids content of the aqueous dispersion, of one or more blocked polyisocyanates, and physically curing the dispersion to form a coating.

DETAILED DESCRIPTION OF THE INVENTION

The aqueous dispersions of the present invention contain 1 to 70 wt. %, preferably 20 to 50 wt. % by weight of polyisocyanate component B), based on the resin solids content of the aqueous dispersion. The aqueous dispersions also preferably contain 30 to 99 wt. %, more preferably 50 to 80 wt. % by weight of polyol component A), based on the resin solids content of the aqueous dispersion. Polyol component A) contains 20 to 60 wt. %, preferably 40 to 55 wt. %, of polyester component A1) and 40 to 80 wt. %, preferably 45 to 60 wt. %, of polyacrylate component A2), wherein the preceding percentages are based on the resin solids content of polyol component A).

Polyester component A1) preferably has a number average molecular weight of 500 to 6000, more preferably 1000 to 3000, an acid number of <12 mg of KOH/g, and an OH number of 50 to 250, more preferably 100 to 180 mg of KOH/g. Polyester component A1) is prepared by the reaction of Al$_1$) 10 to 60%, preferably 30 to 50%, of one or more aliphatic, saturated or unsaturated monocarboxylic acids having 8 to 30 carbon atoms, preferably 80 to 100 wt. % of component Al$_1$) is selected from aliphatic monocarboxylic acids having 12 to 20 carbon atoms and less than two C=C double bonds per molecule.

$Al_{2)}$ 0.4 to 5%, preferably 0.6 to 2%, of one or more α,β-unsaturated mono- or di-carboxylic acids having 3 to 8 carbon atoms, or an anhydride thereof, $Al_{3)}$ 20 to 60%, preferably 25 to 40%, of one or more aliphatic, cycloaliphatic or aromatic di-, tri- or tetra-carboxylic acids having 2 to 20, carbon atoms, or their anhydrides, $Al_{4)}$ 10 to 60%, preferably 20 to 50%, of one or more aliphatic alcohols having 1 to 4 OH groups per molecule, $Al_{5)}$ 0 to 10% of one or more aromatic monocarboxylic acids, $Al_{6)}$ 0 to 10% of other COOH- or OH-reactive compounds, such as epoxides, isocyanates, amines or oxazolines, having 1 to 4, preferably 1.9 to 2.5, functional groups per molecule, wherein the percentages of components $Al_{1)}$ to $Al_{6)}$ are weight percents and add up to 100.

Polyacrylate component A2) is prepared in the presence of polyester component A1) by the radical polymerization of a mixture of by the reaction of $All_{1)}$ 20 to 70%, preferably 25 to 50%, of one or more non-functional esters of α,β-unsaturated carboxylic acids having 3 to 12 carbon atoms and aliphatic or cycloaliphatic monoalcohols having 1 to 18 carbon atoms, $All_{2)}$ 1 to 10%, preferably 2 to 7%, of one or more α,β-unsaturated carboxylic acids having 3 to 12 carbon atoms, or their anhydrides, $All_{3)}$ 0 to 95% of one or more hydroxy-functional, radically polymerizable monomers and $All_{4)}$ 0 to 20% of radically polymerizable monomers other than $All_{1)}$ to $All_{3)}$, wherein the percentages of $All_{1)}$ to $All_{4)}$ are weight percents and add up to 100.

In order to prepare the polyol component A) used according to the invention, the polyester component Al) is initially synthesized by known processes as described below. The polyester component of the polyol dispersion according to the invention contains as the constituent $Al_{1)}$ one or more aliphatic monocarboxylic acids having 8 to 30 carbon atoms. Examples of saturated monocarboxylic acids having 8 to 30 carbon atoms include 2-ethylhexanoic acid, octanoic acid (caprylic acid), decanoic acid (capric acid), dodecanoic acid (lauric acid), hexadecanoic acid (cetylic acid) or octadecanoic acid (stearic acid).

Also suitable are aliphatic, mono- or poly-unsaturated monocarboxylic acids having 8 to 30 carbon atoms, such as oleic acid, linoleic acid or linolenic acid. Preferred are mixtures of monocarboxylic acids, such as those formed in the hydrolysis of natural oils and fats. Examples of such fatty acids include soybean oil fatty acid, tall oil fatty acid, linseed oil fatty acid, castor oil fatty acid, coconut oil fatty acid, groundnut oil fatty acid and safflower oil fatty acid. Other suitable examples of monocarboxylic acids having 8 to 30 carbon atoms are hydrogenated fatty acids, synthetic fatty acids, for example from paraffin oxidation or Koch synthesis (J. Falbe, New Syntheses with Carbon Monoxide, Berlin, Heidelberg, New York (1980)). Preferred are aliphatic carboxylic acids having less than two C=C double bonds.

Other components of the polyesters according to the invention are α,β-unsaturated mono- or di-carboxylic acids $Al_{2)}$ having 3 to 8 carbon atoms. Examples of such carboxylic acids include acrylic acid, methacrylic acid, itaconic acid, maleic acid, fumaric acid and tetrahydrophthalic acid. Instead of the free carboxylic acids, it is also possible to use derivatives of carboxylic acids, such as anhydrides or esters, as starting materials for polyester preparation.

Examples of aliphatic, cycloaliphatic or aromatic di-, tri- or tetracarboxylic acids $Al_{3)}$ having 2 to 40 carbon atoms are phthalic acid, isophthalic acid, terephthalic acid, pyromellitic acid, trimellitic acid, succinic acid, adipic acid, sebacic acid and azelaic acid. Also suitable are dimer fatty acids prepared from natural or synthetic fatty acids. Instead of the free carboxylic acids it is also possible to use derivatives of carboxylic acids, such as anhydrides or esters, as starting materials for polyester preparation.

Examples of OH components $Al_{4)}$ having 1 to 4 OH groups per molecule include aliphatic monoalcohols, such as butanol, pentanol and 2-ethylhexanol. Also suitable are "fatty alcohols", which are formed in the reduction of fatty acids. Examples of alcohol components having 2 OH groups include ethylene glycol, neopentyl glycol, 1,4-butanediol, 1,6-hexanediol, trimethylpentanediol, 1,4-cyclohexanedimethanol, diethylene glycol, triethylene glycol, tripropylene glycol and hydrogenated bisphenol. Examples of alcohol components having 3 or more OH groups are pentaerythritol, glycerol and trimethylolpropane. Preferably, trihydric and higher alcohol components, optionally in combination with dihydric alcohols are used as OH components $Al_{4)}$.

Examples of monocarboxylic acids $Al_{5)}$ include benzoic acid and alkylbenzoic acids.

The preparation of polyester component Al) may be carried out by polycondensation as described in the literature (R. Dhein, K. Reuter, G. Ruf in "Houben-Weyl, Methoden der Organischen Chemie Vol. E20/2", eds: H. Bartl, J. Falbe, 4th edition p. 1429–1435, Stuttgart, New York (1987)). However, it is also possible to react the polyester with other compounds $Al_{6)}$ to incorporate urethane or amide groups into the polyester. Examples include OH-reactive compounds, such as polyisocyanates, and COOH-reactive compounds, such as compounds containing epoxide, amino or oxazoline groups.

Suitable polyisocyanates are preferably aliphatic polyisocyanates, such as hexamethylene diisocyanate, isophorone diisocyanate, methylene-bis-(4-isocyanatocyclohexane), tetramethylxylylene diisocyanate, or modified aliphatic polyisocyanates containing isocyanurate, uretdione or biuret groups. Also suitable, although less preferred, are aromatic polyisocyanates, such as toluylene diisocyanate or methylene-bis-(4-isocyanatobenzene). Suitable epoxides include epoxy resins based on the diglycidyl ether of bisphenol A, or Cardura E 10 (Shell). Suitable amines include hexamethylene diamine, isophorone diamine, diethylene triamine and ethylene diamine.

In the process according to the invention polyacrylate component All) is prepared by free radical polymerization in the presence of polyester component Al). Because of the reaction of the components $All_{1)}$–$All_{4)}$ with the α,β-unsaturated polyester components, graft copolymerization takes place. The resulting graft copolymer has a higher molecular weight and, especially, better tolerability than a mixture of polyester and polyacrylate components.

Preferably, the polymerization reaction is conducted in at least two stages, i.e., a mixture of monomers is initially added and polymerized followed the addition and polymerization of a second mixture of monomers. The two-stage addition is preferably carried out such that the first stage product has an acid number of less than 10 mg of KOH/g and the second stage product has an acid number of more than 20 mg of KOH/g.

In addition to the component Al), organic solvents may also be present during the polymerization. Suitable organic solvents include those which are known for the preparation of polyacrylate resins and for the preparation of aqueous dispersions. Examples include alkylbenzenes such as toluene, xylene and ethylbenzene; and alcohols such as n-butanol, isopropanol, ethylene glycol monobutyl ether, diethylene glycol monobutyl ether, tripropylene glycol, 3-methyl-3-methoxybutanol, 1-methoxy-propylacetate-2 and dipropylene glycol dimethyl ether. Also suitable are acetone, butanone, ethanol, propanol and hexane. The solvents can be partially or completely removed from the reaction mixture before, during or after the dispersing step, e.g., azeotropically and/or by application of a vacuum or a strong stream of inert gas.

In one embodiment components $AII_{1)}$ to $AII_{4)}$ are added separately, together or partially mixed at a suitable temperature to component Al) and optionally a solvent and are polymerized in the presence of a polymerization initiator. Suitable polymerization initiators are known and include peroxides such as dibenzoyl peroxide, di-tert-butyl peroxide and tert-butyl-per-2-ethyl hexanoate; and azo initiators such as azo-bis-isobutyronitrile and azo-bis-isovaleronitrile. It is also possible to carry out the polymerization in the presence of regulators. Suitable regulators, which reduce the molar weight of the polymers by radical transfer, are also known and include n-dodecylmercaptan and mercaptoacetic acid.

In order to achieve particular properties, one or more monomers may be added more rapidly or more slowly, or beginning earlier and/or ending later than the other monomers.

Component $AII_{1)}$ is selected from any copolymerizable (cyclo)alkyl esters of (meth)acrylic acid having 1 to 20 carbon atoms in the cycloalkyl moiety or mixture thereof. Preferred are alkyl acrylates or methacrylates having 1 to 18 carbon atoms in the alkyl moiety. Examples include methyl, ethyl, n-propyl, n-butyl, isobutyl, n-hexyl, 2-ethylhexyl, n-stearyl and n-lauryl acrylates and methacrylates, and also cycloaliphatic (meth)acrylic acid esters, such as cyclohexyl (meth)acrylate and norbornyl (meth)acrylate. Also suitable are esters of maleic or fumaric acid, such as maleic acid and fumaric acid dimethyl or diethyl esters.

Examples of suitable $\alpha,\beta$-unsaturated carboxylic acids $AII_{2)}$ include acrylic acid, methacrylic acid, itaconic acid, maleic acid, fumaric acid and tetrahydrophthalic acid. Instead of the free carboxylic acids it is also possible to use the corresponding anhydrides as the starting material.

Suitable hydroxy-functional monomers $AII_{3)}$ include the hydroxyalkyl or hydroxycycloalkyl esters of the acids mentioned under $AII_{2)}$. The hydroxy-functional esters may be obtained by the reaction of (meth)acrylic acid with an alkylene oxide or an aliphatic diol. Examples include 2-hydroxyethyl (meth)acrylate, 2-hydroxypropyl (meth) acrylate, 3-hydroxypropyl (meth)acrylate, 4-hydroxybutyl (meth)acrylate and the reaction products of (meth)acrylic acid with monoepoxides, such as Cardura E10 (Shell). Also suitable are the esters of (meth)acrylic acid and oligomeric or polymeric ethylene or propylene glycols. Also suitable, but less preferred, are radically polymerizable monomers containing OH groups, which are not derived from $\alpha,\beta$-unsaturated carboxylic acids.

Examples of other radically polymerizable monomers $AII_{4)}$ include vinylaromatic compounds, such as styrene and $\alpha$-methylstyrene; vinyl esters of carboxylic acids having 1 to 20 carbon atoms, such as versatic acid, propionic acid and acetic acid; vinyl ethers; vinylpyrrolidone; and compounds having two or more radically polymerizable double bonds such as butanediol di(meth)acrylate, hexanediol di(meth) acrylate, divinylbenzene and polybutadiene.

For the preparation of a polyol dispersion used according to the invention, the acid groups of the polyester-polyacrylate graft copolymer are subsequently converted into the salt form. That is effected preferably by reaction with an amine. Special preference is given to tertiary amines, such as triethylamine, N,N-dimethylethanolamine or N,N-dimethylisopropanolamine. Neutralization with, for example, metal hydroxides, such as potassium, sodium or lithium hydroxide, or with primary or secondary amines and ammonia is also possible.

In order to convert the resin which has been rendered hydrophilic into an aqueous dispersion, water is subsequently added to the resin with vigorous stirring. It is, however, also possible to place water in a vessel and add, with stirring, the resin which has been rendered hydrophilic. A less preferred method consists in dissolving the neutralizing agent in the water used for the dispersion and adding, with stirring, the resin which has not been rendered hydrophilic, or in placing the resin which has not been rendered hydrophilic in a vessel and adding, with stirring, the solution of the neutralizing amine in water.

The polyol dispersion so prepared can then be formulated together with crosslinking components to a lacquer. Blocked polyisocyanates are preferably used as the crosslinking component. In order to incorporate the blocked polyisocyanate into the aqueous lacquer, it is possible to mix with the polyol dispersion a blocked polyisocyanate which has been rendered hydrophilic. An especially preferred method consists in mixing one or more blocked polyisocyanates which have not been rendered hydrophilic with the polyester-polyacrylate resin before neutralization and dispersing that resin mixture as described.

Examples of polyisocyanates which are suitable as the basis for the blocked polyisocyanates are cycloaliphatic or aliphatic polyisocyanates, such as tetramethylene diisocyanate, cyclohexane 1,3- and 1,4-diisocyanate, hexamethylene diisocyanate (HDI), 1-isocyanato-3,3,5-trimethyl-5-isocyanatomethylcyclohexane (isophorone diisocyanate, IPDI), methylene-bis-(4-isocyanatocyclohexane), tetramethylxylylene diisocyanate (TMXDI).

Preferred polyisocyanates are those containing hetero atoms in the radical containing the isocyanate groups, such as polyisocyanates containing carbodiimide groups, allophanate groups, isocyanurate groups, urethane groups and biuret groups. Especially preferred are the known lacquer polyisocyanates which are modification products which are prepared from the preceding monomeric polyisocyanates, especially hexamethylene diisocyanate or isophorone diisocyanate, and contain biuret, isocyanurate or uretdione groups. Also suitable are low molecular weight polyisocyanates containing urethane groups, which can be obtained by the reaction of an excess of IPDI or TDI with simple polyhydric alcohols having a molecular weight of 62 to 300, preferably trimethylolpropane or glycerol. Mixtures of the preceding polyisocyanates may also be used for the preparation of the products according to the invention.

Suitable polyisocyanates also include the known NCO prepolymers, which may be obtained by reacting the preceding monomeric polyisocyanates, preferably diisocyanates, with compounds containing at least two isocyanate-reactive groups, preferably OH groups, at an equivalent ratio of isocyanate groups to isocyanate-reactive groups of 1.05:1 to 10:1, preferably 1.1:1 to 3:1. The nature of the starting materials and their amounts are selected such that the NCO prepolymers preferably have an average NCO functionality of 2 to 3 and a number average molecular weight of 500 to 10,000, preferably 800 to 4000.

The isocyanate groups of the polyisocyanates are fully blocked with known blocking agents for stoving lacquers. Examples of suitable blocking agents include malonic acid dimethyl ester, malonic acid diethyl ester, acetoacetic acid ethyl ester, ε-caprolactam, acetanilide, secondary aliphatic amines and/or acetoneoxime. Preferred blocking agents include butanone oxime, 3,5-dimethylpyrazole and 1,2,4-triazole.

Blocking of the polyisocyanates may be carried out by heating the polyisocyanate with the blocking agent. For example, one or more polyisocyanates can be placed in a vessel and heated, with stirring, to approximately 80° C. and the blocking agent can be added (for example, over a period of approximately 10 minutes). Stirring is carried out until no more free isocyanate groups are detectable. It is also possible to block one or more polyisocyanates with a mixture of two or more blocking agents.

The blocked polyisocyanates are preferably hydrophobic, i.e., they are not rendered hydrophilic. They are preferably converted into an aqueous dispersion by mixing and dispersing together with the polyol resin. However, it is also possible to disperse the polyol on its own and add to the aqueous phase a solution or dispersion of a blocked polyisocyanate which has been rendered hydrophilic. Hydrophilic blocked polyisocyanates are known and described, e.g., in EP-A 566,953.

The aqueous binders according to the invention can be combined with other binders, e.g. water soluble or water insoluble melamine resins, hydrophilic blocked polyisocyanates and/or water dilutable polyesters or water dilutable polyester/polyurethane resins. The aqueous binders may preferably contain 2 to 15 wt. % of water soluble or water insoluble water dispersible melamine resins or hydrophilic blocked polyisocyanates and/or 2 to 30 wt. % of water dilutable polyesters or water dilutable polyester/polyurethane resins, wherein the preceding percentages are based on the resin solids content of the stoving lacquer.

The stoving lacquers or coating compositions may also contain known additives, such as pigments and fillers, in amounts which are also known in the art.

In accordance with the present invention the aqueous dispersions are used in the preparation of stoving lacquers which rapidly harden physically at low temperature. By physically curing it is meant that the resin particles of the dispersion coalesce to form a coating by physical means, i.e., without the need for a chemical reaction. The aqueous dispersions are preferably used for the initial coating of motor vehicles, especially for the preparation of barrier coatings that are resistant to the impact of stones. The coating compositions can be applied by knife application, dipping, spray application (such as compressed-air or airless spraying) and electrostatic application (such as high-speed rotating bell application). The layer thickness of the dry film is about 10 to 50 µm.

It is advantageous that the binders according to the invention may be initially dried at low temperature, for example at 80° C., such that the lacquer coating can be polished. After overpainting with a base coat/clear coat or with a pigmented top coat, the barrier coating is then stoved together with the clear coat or the finishing top coat in one stoving operation. That step is carried out, for example, by stoving for a period of 20 to 25 minutes at 135 to 145° C.

The properties of the resulting coatings are comparable both visually and mechanically to coatings prepared by applying an aqueous or solvent-containing filler in known manner at a dry film layer thickness of 25 to 40 µm and curing the coating, e.g., for 20 to 25 minutes at 135 to 165° C., prior to the application of a base coat and clear coat or a pigmented top coat.

The coating compositions containing the dispersions according to the invention have a very good storage stability. The chemical degradation by cleavage of ester bonds, which usually takes place very quickly when aqueous polyester dispersions or solutions or polyester-polyurethane dispersions are stored, is not observed with the polyester-polyacrylate dispersions according to the invention. At the same time, the coatings prepared from the dispersions according to the invention have excellent resistance to the impact of stones, which in the case of aqueous lacquers could previously be achieved only by systems based on polyester dispersions.

The invention is further illustrated but is not intended to be limited by the following examples in which all parts and percentages are by weight unless otherwise specified.

EXAMPLES

Example 1

Polyester Resin 4041 g of groundnut oil fatty acid, 4350 g of trimethylolpropane, 1131 g of triethylene glycol, 99 g of maleic anhydride, 2035 g of phthalic anhydride and 2008 g of adipic acid were weighed into a 15 liter reaction vessel equipped with a stirring, cooling and heating device and a water separator. Nitrogen was passed through the reaction mixture. The batch was heated to 185° C. in 4 hours. After 2 hours at 185° C., it was heated to 220° C. in the course of an additional 2 hours. A strong stream of nitrogen (approximately 30 liters/hour) was passed through the batch at that temperature until the acid number had fallen to 9 mg of KOH/g. The OH number was 196 mg of KOH/g.

Example 2

Polyester-polyacrylate Resin 500 g of the polyester resin of Example 1 and 33.4 g of butyl diglycol (diethylene glycol monobutyl ether) were placed, under a nitrogen atmosphere, in a 6 liter four-necked flask equipped with an internal thermometer, a stirring device, a dropping funnel, a gas inlet and a reflux condenser. A monomer mixture of 75 g of hydroxyethyl methacrylate, 56 g of butyl acrylate, 271 g of methyl methacrylate and 50 g of styrene was prepared in the dropping funnel. At a temperature of 145° C., half the monomer mixture was metered in over a period of 3 hours. In parallel, a solution of 10 g of di-tert-butyl peroxide in 40 g of butyl diglycol was metered in. 48 g of acrylic acid were then added to the rest of the monomer mixture, and the whole was mixed. The other half of the monomer mixture was then metered in over a period of 1.5 hours. In parallel, a solution of 5 g of di-tert-butyl peroxide in 20 g of butyl diglycol was metered in. A further solution of 5 g of di-tert-butyl peroxide in 20 g of butyl diglycol was subsequently metered in for the purpose of activation.

Example 3

Self-crosslinking Polyester-polyacrylate Dispersion 600 g of the polyester-polyacrylate resin of Example 2 and 613 g of Desmodur BL 3175 (blocked polyisocyanate resin based on hexamethylene diisocyanate, 75% dissolved in solvent naphtha 100 solvent) were homogenized at 70° C. under a nitrogen atmosphere in a 4 liter four-necked flask equipped with an internal thermometer, a stirring device, a gas inlet and a reflux condenser. 61 g of N,N-dimethylethanolamine were added, and stirring was carried out for 30 minutes. 1153 g of water were then added. The product was a milky aqueous dispersion having an average particle size of 213 nm (determined by laser correlation spectroscopy), a viscosity of 3574 mPa.s and a solids content of 43.2%.

A coating of the self-crosslinking polyester-polyacrylate dispersion was applied to a glass plate in a wet film layer thickness of 210 μm and dried for 10 minutes at ambient temperature. Forced drying is then carried out for an additional 30 minutes at 80° C. After cooling to room temperature, the coating was touch-dry and could readily be polished.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a coated substrate which comprises coating the substrate with an aqueous dispersion comprising
    A) a polyol component comprising
        A1) 20 to 60 wt. %, based on the resin solids content of polyol component A), of a polyester resin containing 10 to 60 wt. %, based on the weight of the polyester resin, of one or more aliphatic, saturated or unsaturated monocarboxylic acids having 8 to 30 carbon atoms, and 0.4 to 5 wt. %, based on the weight of the polyester resin, of one or more radically polymerizable α,β-unsaturated mono- or di-carboxylic acids having 3 to 8 carbon atoms, or their anhydrides, and
        A2) 40 to 80 wt. %, based on the resin solids content of polyol component A), of a polyacrylate, which is prepared in the presence of component A1), and
    B) 1 to 70 wt. %, based on the resin solids content of the aqueous dispersion, of one or more blocked polyisocyanates. for light-stable, elastic and physically rapidly drying coatings in the series lacquering of motor vehicles,
and physically curing the dispersion to form a coating.

2. The process of claim 1 wherein polyester component Al) has a number average molecular weight of 500 to 6000, an acid number of <12 KOH/g and an OH number of 50 to 250 mg of KOH/g, and is prepared from
    $Al_{1)}$ 10 to 60% of one or more aliphatic, saturated or unsaturated monocarboxylic acids having 8 to 30 carbon atoms,
    $Al_{2)}$ 0.4 to 5% of one or more α,β-unsaturated mono- or di-carboxylic acid having 3 to 8 carbon atoms, or an anhydride thereof,
    $Al_{3)}$ 20 to 60% of one or more aliphatic, cycloaliphatic or aromatic di-, tri- or tetra-carboxylic acids having 2 to 20 carbon atoms, or their anhydrides,
    $Al_{4)}$ 10 to 60% of one or more aliphatic alcohols having 1 to 4 OH groups per molecule,
    $Al_{5)}$ 0 to 10% of one or more aromatic monocarboxylic acids,
    $Al_{6)}$ 0 to 10% of one or more other COOH- or OH-reactive compounds having 1 to 4 reactive groups per molecule,
wherein the percentages of components $Al_{1)}$ to $Al_{6)}$ are weight percents and add up to 100.

3. The process of claim 1 wherein polyacrylate component All) is prepared in the presence of polyacrylate component Al) by the radical polymerization of a mixture of
    $All_{1)}$ 20 to 70% of one or more non-functional esters of α,β-unsaturated carboxylic acids having 3 to 12 carbon atoms and aliphatic or cycloaliphatic monoalcohols having 1 to 18 carbon atoms,
    $All_{2)}$ 1 to 10% of one or more α,β-unsaturated carboxylic acids having 3 to 12 carbon atoms, or their anhydrides,
    $All_{3)}$ 0 to 95% of one or more hydroxy-functional, radically polymerizable monomers,
    $All_{4)}$ 0 to 40% of one or more radically polymerizable monomers other than $All_{1)}$ to $All_{3)}$,
wherein the percentages of $All_{1)}$ to $All_{4)}$ are weight percents and add up to 100.

4. The process of claim 2 wherein polyacrylate component All) is prepared in the presence of polyacrylate component Al) by the radical polymerization of a mixture of
    $All_{1)}$ 20 to 70% of one or more non-functional esters of α,β-unsaturated carboxylic acids having 3 to 12 carbon atoms and aliphatic or cycloaliphatic monoalcohols having 1 to 18 carbon atoms,
    $All_{2)}$ 1 to 10% of one or more α,β-unsaturated carboxylic acids having 3 to 12 carbon atoms, or their anhydrides,
    $All_{3)}$ 0 to 95% of one or more hydroxy-functional, radically polymerizable monomers,
    $All_{4)}$ 0 to 40% of radically polymerizable monomers other than $All_{1)}$ to $All_{3)}$,
wherein the percentages of $All_{1)}$ to $All_{4)}$ are weight percents and add up to 100.

5. The process of claim 1 wherein polyisocyanate component B) has not been rendered hydrophilic.

6. The process of claim 2 wherein polyisocyanate component B) has not been rendered hydrophilic.

7. The process of claim 3 wherein polyisocyanate component B) has not been rendered hydrophilic.

8. The process of claim 4 wherein polyisocyanate component B) has not been rendered hydrophilic.

9. The process of claim 1 wherein polyol component A) contains 40 to 55 wt. % of polyester component Al) and 45 to 60 wt. % of polyacrylate component All).

10. The process of claim 9 wherein polyester component Al) has a number average molecular weight of 1000 to 3000.

11. The process of claim 1 wherein polyester component Al) contains 30 to 50% of said monocarboxylic acids having 8 to 30 carbon atoms.

12. The process of claim 3 wherein component $Al_{1)}$ contains 80 to 100 wt. % of one or more aliphatic monocarboxylic acids having 12 to 20 carbon atoms and less than two C=C double bonds per molecule.

13. The process of claim 4 wherein polyacrylate component All) is polymerized by the addition of monomers in two stages, such that the first stage product has an acid number of less than 10 mg of KOH/g and the second stage product has an acid number of more than 20 mg of KOH/g.

14. The process of claim 1 wherein the aqueous dispersion additionally contains one or more water dispersible melamine resins, hydrophilic blocked polyisocyanates, water dilutable polyesters or water dilutable polyester/polyurethane resins.

* * * * *